April 27, 1954

J. C. WOOLEY 2,676,423

CONVEYER ADJUSTMENT FOR TERRACING MACHINES

Filed May 1, 1948

INVENTOR.
JOHN C. WOOLEY
BY
ATTORNEYS

April 27, 1954

J. C. WOOLEY 2,676,423

CONVEYER ADJUSTMENT FOR TERRACING MACHINES

Filed May 1, 1948

INVENTOR.
JOHN C. WOOLEY
BY
ATTORNEYS

April 27, 1954

J. C. WOOLEY 2,676,423

CONVEYER ADJUSTMENT FOR TERRACING MACHINES

Filed May 1, 1948

INVENTOR.
JOHN C. WOOLEY
BY
ATTORNEYS

April 27, 1954        J. C. WOOLEY        2,676,423
CONVEYER ADJUSTMENT FOR TERRACING MACHINES
Filed May 1, 1948        6 Sheets-Sheet 5

*INVENTOR.*
JOHN C. WOOLEY
BY
ATTORNEYS

April 27, 1954  J. C. WOOLEY  2,676,423
CONVEYER ADJUSTMENT FOR TERRACING MACHINES
Filed May 1, 1948
6 Sheets-Sheet 6

INVENTOR.
JOHN C. WOOLEY
BY
ATTORNEYS

Patented Apr. 27, 1954

2,676,423

UNITED STATES PATENT OFFICE 2,676,423

CONVEYER ADJUSTMENT FOR TERRACING MACHINES

John C. Wooley, Columbia, Mo.

Application May 1, 1948, Serial No. 24,449

6 Claims. (Cl. 37—110)

The present invention relates generally to agricultural machines and more particularly to terracing machines of the conveyor type, embodying generally a plow element for loosening and removing soil and a laterally movable conveyor element receiving the loosened soil from the plow element and transferring the same laterally, whereby a terrace may be built by making several passes across a field or other place where the terrace is desired.

The object and general nature of the present invention is the provision of a terracing machine embodying a new and improved frame construction wherein the plow element and conveyor or elevator are supported on separate but pivotally interconnected frames, each having a supporting ground wheel and mechanism arranged to raise and lower the plow element and the adjacent end of the conveyor or elevator.

Another feature of the present invention is the provision of a terracing machine having a plow element in the form of a disk, together with a pair of guides or wheels disposed ahead of and behind the disk and arranged to bear against the furrow wall for the purpose of guiding and stabilizing the terracing machine in operation.

A further feature of this invention is the provision of a particular kind of plow element embodying a main furrow forming disk and an auxiliary plow element arranged rearwardly of the first mentioned disk and disposed so as to remove the top soil from the ground adjacent the furrow and deposit the same in an adjacent furrow, so as to prevent placing all of the desirable top soil within the terrace, while leaving the upper and adjacent surfaces of the latter bare and without good tillable soil.

Still further, another feature of the present invention is the provision of a terracing machine having a reversible disk whereby the machine may be operated back and forth on the same side of the terrace for continually adding soil to construct the terrace as desired, thereby eliminating any necessity for operating on both sides of the terrace for building the latter.

These and other objects and advantages of the present invention will be apparent to those skilled in the art after a consideration of the following detailed description, taken in conjunction with the accompanying drawings, in which:

Figure 1:
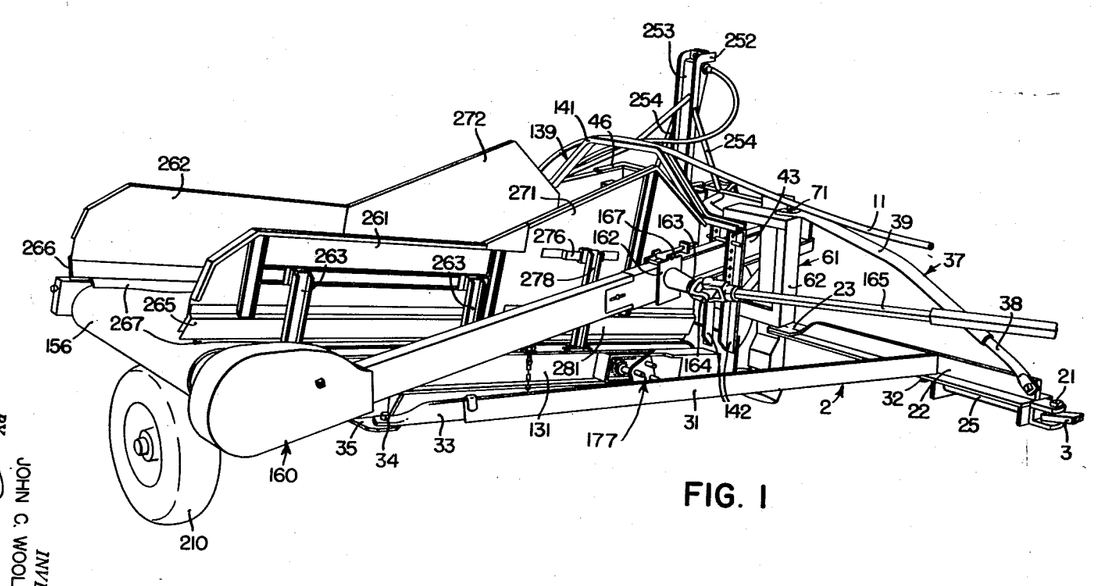
Figure 1 is a front view of a terracing machine in which the principles of the present invention have been incorporated.
Figure 2:
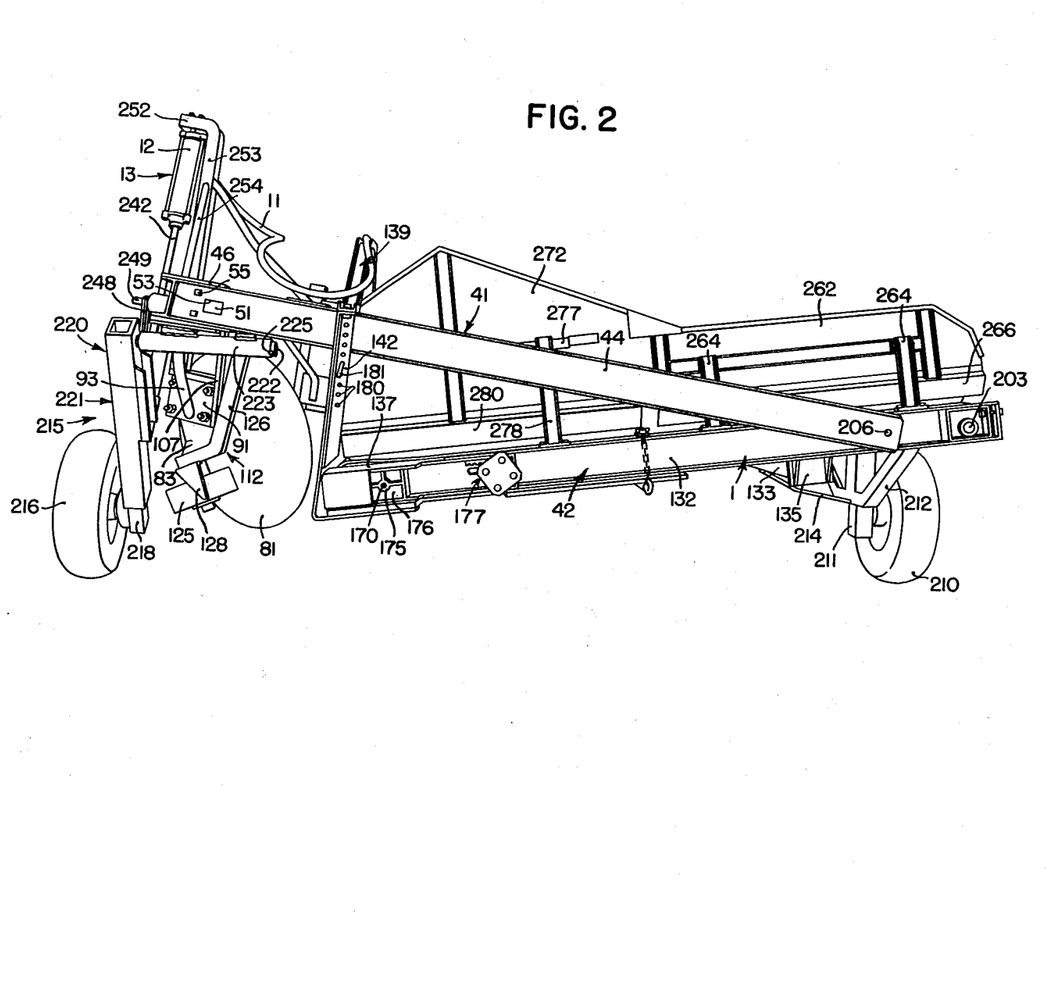
Figure 2 is a rear view of the terracing machine shown in Figure 1.
Figure 3:
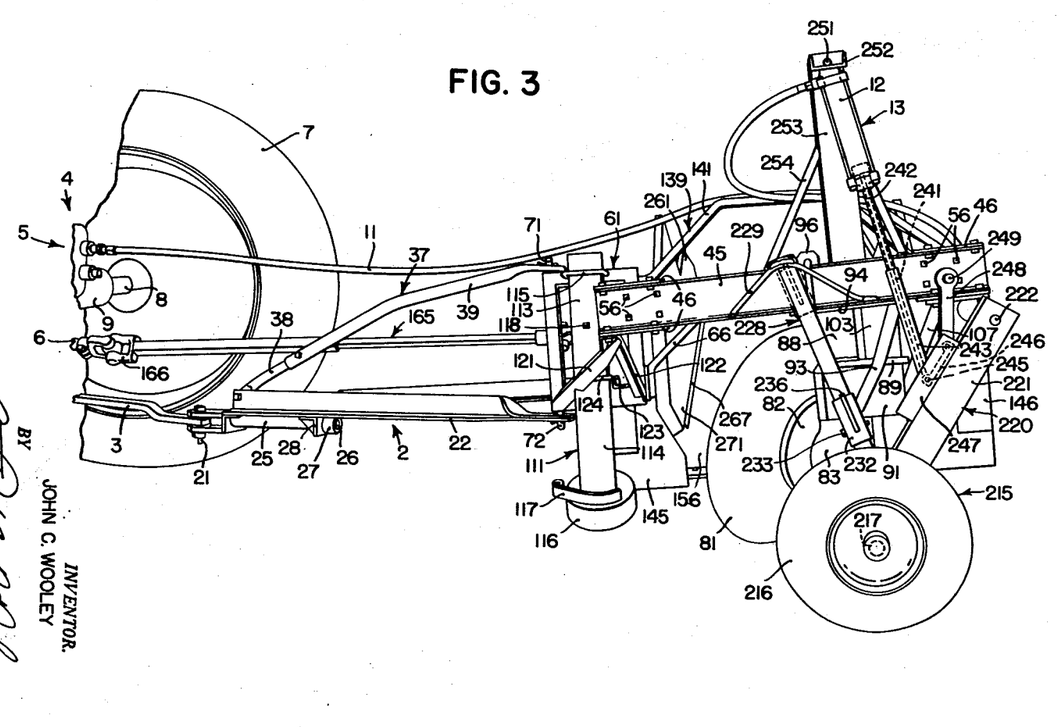
Figure 3 is a side view showing particularly the landward supporting wheel and means for raising and lowering the end of the frame carrying the plow element or disk.

Referring now more particularly to Figures 1-3, the terracing machine of the present invention includes a main frame construction indicated in its entirety by reference numeral 1 and disposed generally transversely with respect to the direction of travel, and a hitch frame 2 connected in a vertical rigid manner with the main frame construction 1 and with the drawbar 3 of a propelling tractor 4. The tractor 4 is of conventional construction, so far as the present invention is concerned, including a hydraulic unit 5, a power take-off shaft 6, and rear drive wheels 7 mounted fixedly on drive shafts 8 journaled for rotation in a rear axle structure 9. The power lift unit 5 is of conventional construction so far as the present invention is concerned, incorporating a hydraulic unit adapted to be controlled by the operator and including a hose line 11 for conveying liquid under pressure to and from a single acting cylinder 12 on the implement. The cylinder 12 forms a part of a ram unit 13 to which more detailed reference will be made below.

The hitch frame 2 is adapted to be connected to the drawbar 3 of the tractor 4 by means of a hitch pin 21, and the hitch frame 2 includes a main draft member 22, preferably of T shape and having its rear end flattened, as at 23, and apertured. The front end of the hitch bar 22 carries a sleeve 25 in which a draft pin 26 is disposed. A collar 27 is fixed to the rear end of the pin 26 and serves to transmit the forward pull to the hitch frame 2 through a reenforcing angle 28. The hitch frame 2 also includes a diagonal angle 31 which is connected at its front end by a bolt 32 to the main draft bar 22 and at its rear end is connected adjustably to an extension 33 which is apertured to receive a stud 34 fixed to a bracket 35 that is fixed to the forward side of the implement frame. The main draft member 22 is held against vertical movement relative to the implement by means of a brace bar 37 which is made up of two adjustably associated sections 38 and 39, the former being connected to the front end of the main hitch bar 22 and the section 39 being connected at its rear end to an upper portion of the implement.

Figure 9:
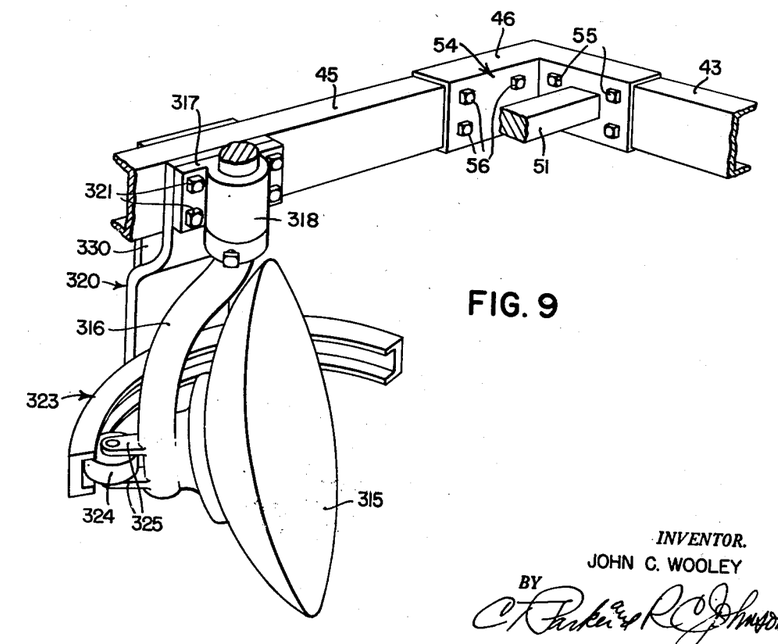
Figure 9 is a further modified form showing the provision of a reversible disk.

The frame 1 of the implement includes two frame sections 41 and 42. The former frame section or plow frame, is preferably of U-shaped formation, best shown in Figure 4, and includes front and rear side sections 43 and 44, and a central or interconnecting section 45 disposed at one side of the machine. The sections 43, 44 and 45 are preferably channels interconnected at their junctions by any suitable means, such as upper and lower reenforcing plates 46. Preferably, the adjacent ends of the channels 43 and 44 are apertured, as shown in Figure 2, at 53, to receive the ends of a heavy cross bar 51. The ends of the bar 51 are welded to angle brackets 54 (Figure 9) which are bolted, as at 55 and 56, to the channels 43, 44 and 45. The angle brackets 54 also are welded to the upper and lower plates 46, the brackets 54 also being bolted to the interconnecting frame section 45, as shown in Figure 9.

Figure 5:
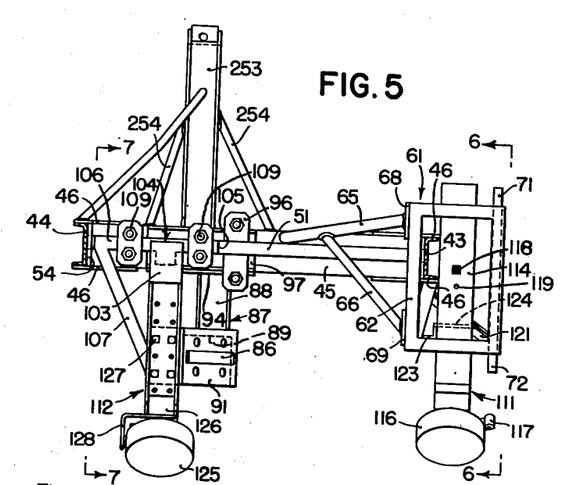
Figure 5 is a sectional view taken on the line 5—5 of Figure 4.

Secured to the plow frame section 41 is a draft-receiving rectangular sub-frame, indicated in its entirety by the reference numeral 61. This member is preferably formed of four channel sections suitably welded together and disposed in a generally vertical position with the rear vertical channel member 62 thereof secured, as by welding, to the inner face of the plow frame channel 43. The sub-frame 61 is reenforced by a pair of braces 65 and 66. The brace 65 extends between the upper portion of the channel 62 and the two frame members 51 and 45 to which the brace 65 is welded. The forward end of the brace 65 is welded to a plate 68 which in turn is bolted, welded or otherwise fixed to the channel 62, as best shown in Figure 5. The other brace member 66 extends from the upper brace 65 downwardly to the lower end portion of the channel 62, the lower end of the brace 66 being fixed, as by welding, to an attachment plate 69 which in turn is fixed in any suitable manner to the lower end of the channel 62. The sub-frame 61 carries upper and lower stud sections 71 and 72 which, as best shown in Figure 3, receive the upper and lower draft members 39 and 22. If desired, the studs 71 and 72 may comprise a single generally vertically disposed shaft secured in any suitable way to the draft frame section 61.

Figure 7:
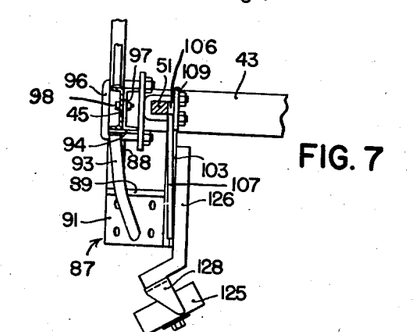
Figure 7 is a view taken generally along the line 7—7 of Figure 5.
Figure 7A:
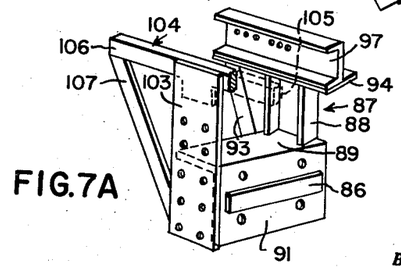
Figure 7a is a fragmentary perspective view, showing details of the disk standard and associated bracing structure.

As best shown in Figures 2 and 3, a plow element in the form of a disk 81 is mounted by journal means 82 (Figure 3) on the lower end of a disk bearing support 83. The upper portion of the support 83 is provided with a channel or groove which seats over a plate 86 (Figure 5) fixed to the lower end of a disk standard 87. The latter member preferably comprises a channel 88 (Figure 5) disposed generally vertically and fixed at its lower end to a plate 89 (Figure 7) disposed generally horizontally and to which a vertical apertured plate 91 is fixed, as by welding. The apertures in the support 83 and the apertures in the plate 91 may be slotted so as to provide for lateral adjustment of the member 83 relative to the member 91. The member 91 is reenforced by a brace 93 which is welded at its lower end to the lower portion of the plate 91, to the rear edge of the horizontal plate section 89 (Figure 7) and at its upper end to a plate 94 (Figure 3) to which the upper end of the channel 88 is also fixed, preferably by welding. Secured to the plate 94 at its upper side is an attaching channel section 97, and the latter is fixed to the frame channel 45 by a clamp bolt 96 and by one or more bolts 98.

The plow disk standard 87 also includes a vertical plate 103 which is welded at its lower end to the disk bearing support receiving member 91 and at its upper end to a generally T-shaped attaching section 104 which is provided with fore and aft extending portions 105 and 106 which are rigidly secured to the bar 51 by a pair of clamps 109 mentioned above. The rear attaching plate extension 106 extends rearwardly beyond the rear clamp 109 and receives a diagonally downwardly extending brace 107 which is welded at its upper end to the extension 106 and at its lower end to the lower portion of the plate 103.

Figure 6:
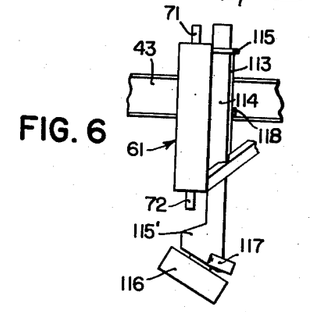
Figure 6 is a view taken generally along the line 6—6 of Figure 5.

Front and rear guide wheel units 111 and 112 are carried by the plow frame 41 fore and aft of the plow element or disk 81. The front guide wheel unit comprises a vertically disposed channel member 114 disposed between the draft frame 61 and a vertical plate 113 (Figure 6). The upper end of the latter is fixed to the frame 61 by a U-shaped part 115. The lower end of the member 114 is provided with a suitable extension 115' which provides a support for a stub shaft or the like on which a furrow wall engaging roller 116 is mounted, preferably at an angle so as to bear substantially flat against the adjacent portions of the furrow wall, as indicated in Figure 6. An auxiliary shoe guide 117 is fixed to the lower end of the member 114 just above the roller 116. The member 114 is arranged to be raised and lowered, and to this end the plate 113 is apertured to receive a bolt 118 and the channel 114 has two or more holes 119 to receive the bolt 118 in either of two or more vertical positions. The lower end of the plate 113 is welded to one of the two braces 121 and 122 (Fig. 3) which connect the lower portion of the draft frame section 61 with the adjacent end of the frame channel 45. Also, a pair of short angles 123 are welded to the lower section of the draft frame 61 and disposed on opposite sides of the guide wheel standard 114 and are connected by a strap 124 which embraces the standard 114, effectively fixing the lower end of the latter in position. The rear guide wheel unit 112 is disposed generally rearwardly of the plow disk 81 and includes a roller 125 rotatably mounted on the lower angled portion of a channel 126 which is fastened in different positions of vertical adjustment to the plate 103 by bolt means 127. A scraper 128 is fixed to the lower end of the channel 126.

Figure 4:
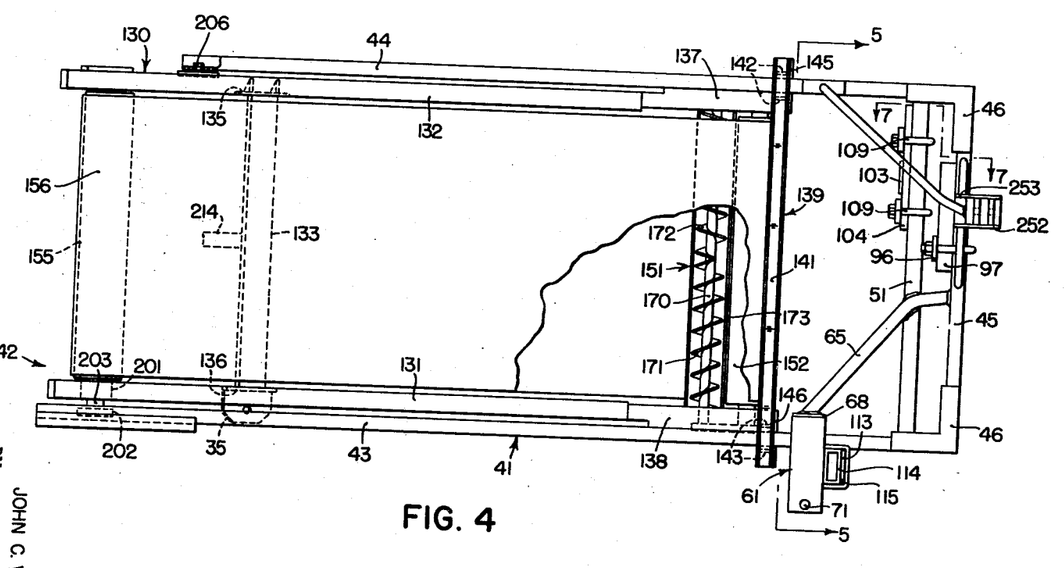
Figure 4 is a fragmentary plan view showing certain details of the frame construction.

The frame proper of the conveyor or elevator unit 42 is indicated in Figure 4 by the reference numeral 130 and comprises a front channel 131 and a rear channel 132 secured together in fore and aft spaced relation by an angle member 133 welded at its ends to depending brackets 135 and 136 that in turn are welded to the lower portion of the channels 131 and 132. The forward bracket 135 serves to receive the draft bracket section 35. The channels 131, 132 and cross angle 133 constitute one portion of the frame 130, the other portion of which includes a pair of inner channel sections 137 and 138 and an interconnecting yoke 139. Said frame portions just mentioned constitute relatively adjustable inner and outer frames or conveyor frame sections. The yoke unit is made up of a vertically arched channel member 141, two pairs of vertical laterally spaced apart angles 142 and 143 and plate members 145 and 146 (Figure 4) to which the angles 142 and 143 are fixed. The channels 43 and 44 of the plow frame section extend between the angles making up the pairs 142 and 143, as best shown in Figure 4, the vertical plates 145 and 146 being slotted to receive the channels and provide for the raising and lowering of the inner end of the conveyor frame unit 42 relative to the plow frame unit. At the upper ends of the angles 142 and 143, the outer ends of the arched channel 141 are secured, as by bolts, to the plate members 145 and 146. The extension channel sections 137 and 138 are rigidly interconnected by a generally semi-circular channel or trough 151. The members 137 and 138 form the means for supporting a laterally inner conveyor or elevator roller 152, the members 137 and 138 carrying suitable bearings for this purpose. The outer ends of the channels 131 and 132 carry suitable bearings for receiving a laterally outer elevator and conveyor roller 155. An endless elevator or conveyor belt 156 is trained over the rollers 152 and 155, and by adjusting the positions of the members 137 and 138 relative to the channels 131 and 132, the belt 156 may be maintained in taut load-bearing relation. Suitable additional rollers and/or braces may be provided between the channels 131 and 132 and the members 137 and 138 if deemed necessary. The roller 155 constitutes the driving element for driving the conveyor or elevator belt 156 and may be driven by any suitable means, such as a conventional sprocket and chain construction enclosed within a housing 160 supported on the front channel 43 of the plow frame unit 41. The channel 43 adjacent its inner end carries an adjustable support 162 in which a driving sprocket is disposed, the sprocket being mounted on a shaft 163 which is connected by a universal joint 164 with an extension power shaft 165 driven through a universal joint 166 from the power take-off shaft 6 of the tractor A. Suitable adjusting means 167 provides for shifting the driving sprocket support 162 along the channel 43 whereby the proper tension in the driving chain may be maintained.

The supporting shaft of the inner roller 152 is connected through suitable sprocket and chain mechanism (not shown) carried by one of the members 137 and 138 to drive a double auger shaft 170 on which two worms 171 and 172 are fixed. The worms or augers 171 and 172 are of opposite hand, and the augers fit closely in the channel 151, one edge 173 of which engages the surface of the roller 152 so as to scrape adhering soil and the like therefrom, the oppositely formed augers 171 and 172 working the soil outwardly of the conveyor unit through openings in the members 137 and 138 formed for that purpose. The auger shaft 170 is mounted in any suitable bearing means, as indicated by the reference numeral 175 in Figure 2, which shows the rear end of the auger shaft. One of the openings through which the rear auger section 172 moves the soil is indicated by the reference numeral 176 in Figure 2. The adjusting means for the lower conveyor support members 137 and 138, indicated generally at 177 in Figures 1 and 2, and the drive for the clean-out augers are substantially like that shown in U. S. Patent 2,089,319, issued August 10, 1937, to John C. Wooley et al. and reference may be had to such patent if necessary. The pairs of angles 142 and 143 are provided with a plurality of openings 180 (Figure 2), and by raising the inner end of the conveyor unit and placing a pair of pins 181 in selected openings the inner end of the conveyor unit may be supported at different heights relative to the plow frame, thus disposing the receiving end of the conveyor unit in different positions relative to the plow disk 81. The two frames, namely, plow frame 41 and the conveyor frame 42, are pivotally interconnected in any suitable way. Preferably, the outer ends of the channels 43 and 131 are interconnected through axially aligned bearing means 201 and 202 in which the forward end of the shaft 203, forming a part of the power driven elevator roller 155, is received. The outer end of the rear plow frame channel 44 is pivotally connected by a bolt or the like, as indicated at 206, with the rear conveyor frame channel 132, as best shown in Figure 4. If desired, however, the channel 44 may be pivoted to the frame 130 at a point coincidental with the axis of the roller 155.

The laterally outer end of the conveyor unit 42 is supported on a ground wheel 210 which is carried at the lower end of a standard 211 that is adjustably received in a depending bracket structure 212, best shown in Figure 2, which connects across the outer ends of the channels 131 and 132. A transverse brace 214 is connected between the central portion of the bracket structure 212 and the cross angle 133, as best shown in Figures 2 and 4. At the other side of the machine the outer end of the plow frame is supported on a vertical swingable ground engaging support, indicated in its entirety by the reference numeral 215. As best shown in Figure 3, the support 215 includes a ground wheel 216 mounted for rotation on a stub axle 217 extending laterally outwardly (Figure 2) from the lower end of an upwardly and rearwardly extending shank 218 which is fixed to the lower end of a box strut member 221. A laterally inwardly extending shaft 222 is fixed at its outer end to the upper end of the member 221 and is rockably received in a sleeve 223 fixed to the laterally outer end of the rear frame channel 44, as best shown in Figure 2. Preferably, the sleeve 223 is fixed at a flat angle to the channels 44 whereby the shaft portion 222 is normally horizontal while the plow frame 41 is in a normally angled position, as shown in Figure 2. The shaft 222 is held in position in the sleeve 223 by a collar 225 or other suitable means.

As best shown in Figure 3, a tubular link 228 is connected at its lower end to the lower portion of the box strut member 221, and at its upper end the link member 228 is fixed to an opening in a bracket 229 that is fixed to the central channel 45 of the plow frame unit 41. A tubular stop member in the form of a slide 232 is disposed about the tubular link 228 and may be fixed in different positions relative thereto, as by a pin or bolt 233. The slide 232 is provided with a bracket-engaging lug 236, and when the slide is in an uppermost position on the link 228, as shown in dotted lines in Figure 3, the frame 41 is held in an elevated position relative to the surface of the ground, which also holds the disk 81 and associated parts, together with the receiving end of the conveyor unit, in an elevated position. The sleeve 232 may be disposed in different positions on the tubular link 228 manually.

The stub shaft 217, box strut member 221 and shaft 222 constitute a crank axle structure 229 swingably mounted on the plow frame and adapted to be shifted generally vertically for disposing the ground wheel 216 in different positions so as to control the working and transport positions of the disk 81. As mentioned above, the ram unit 13 is connected with the crank axle 220 for shifting the wheel 216 relative to the associated frame. To this end, a piston rod 241 (Figure 3), which is disposed within a pair of telescoping protecting sleeves 242 and 243 connected respectively to the cylinder 12 and the crank axle 220, is pivotally connected, as at 245, to a slide 246 which is shiftably disposed between a pair of guides 247 carried by the crank member 221. A link 248 is pivoted to the upper end of the slide 246 and to the frame channel 45, as indicated at 249. The purpose of this arrangement is to give the ram unit 13 a greater mechanical advantage when the crank member 220 is more nearly in a horizontal position than when it is in a more nearly vertical position, the latter position being indicated in Figure 3. As will be clear from Figure 3, a given angular displacement of the crank axle member 220 when the frame is in a more nearly vertical position results in a smaller amount of lifting or lowering of the frames than when the crank axle is more nearly in a horizontal position, and hence when the parts are in the position shown in Figure 3, the ram unit 13 need not have as great a moment arm as when the crank axle is more nearly in a horizontal position. When the machine is in operation, the slide 232 may be disposed in such position that the disk 81 may be lowered into operating position merely by releasing the fluid in the cylinder 12, depending upon the contact between the slide 232 and the bracket 229 determining the proper operating position, or the ram unit 13 may be relied upon entirely for determining the operating position when the slide 232 is moved into a lowermost position, as indicated in Figure 3 in full lines. The upper end of the cylinder 12 is pivotally connected by a pin 251 carried by a bracket structure 252 supported at the upper end of a channel standard 253. The latter member is secured in any suitable way, as by welding, to the channel 45 and is reenforced by the generally fore and aft extending braces 254.

The laterally outer end of the conveyor unit 42 is provided with a pair of side members 261 and 262 which preferably are supported by brackets 263 and 264 fixed at their lower ends to the channels 131 and 132. The lower or inner edges of the side members 261 and 262 are bent inwardly over the conveying portion of the elevator belt 256, and auxiliary sheet metal flange members 265 and 266 are fixed to the lower edges of the side members to receive flexible strips 267. The strips 267 overlie the conveying portion of the belt 156 and prevent dirt from dropping off the belt before it reaches the discharge end of the machine, being the left end as shown in Figure 1. A pair of inner side members 271 and 272 are arranged in telescoping relation with the laterally inner ends of the side members 261 and 262. The inner side members 271 and 272 are supported at their laterally innermost ends by suitable connections to the yoke plates 145 and 146, and to accommodate the movement of the inner side members 271 and 272 relative to the outer side members when the extension channel members 137 and 138 are shifted relative to the outer channel sections 131 and 132, the laterally inner side members 271 and 272 carry horizontal brackets 276 and 277 which are slidably supported at the upper ends of a pair of standards 278 which are fixed to the channel members 131 and 132 on opposite sides of the conveyor frame 42. The laterally inner side members 271 and 272 carry sheet metal flange members 280 and 281, similar to the flanges 265 and 266 mentioned above. The laterally innermost ends of the sealing strips 267 are received within the channel members 280 and 281 so as to prevent loss of soil from the inner portions of the belt 155.

The operation of the machine as so far described is substantially as follows.

After the machine is hitched, at 21, to the tractor drawbar 3 and the drive shaft 165 connected with the power take-off shaft of the tractor, the machine is ready for operation. For transporting the machine to the field the crank axle 220 is swung downwardly into the position shown in Figure 3, which raises the disk 81 and furrow or guide wheels 116 and 125 out of contact with the ground. When the field is reached the operator actuates the power lift unit 5 so as to release the fluid in the cylinder 12. This permits the machine to lower, the working depth or position of operation being determined either by the position of the depth adjustment slide 232 or by the operator terminating the flow of fluid from the cylinder 12 at the desired point. For making the first round, the operator raises the guide unit 111 and places the bolt 118 in the lowermost hole 119 so as to hold the unit 111 out of contact with the ground for the first round, but after the latter has been completed the operator removes the bolt 118, moves the unit 111 to a lower position, so as to engage a furrow wall, and replaces the bolt 118 so as to hold the unit 111 in the position shown in Figures 3 and 5. Thus, normally the front and rear guide wheels 116 and 125 hold the disk 81 in proper position by bearing against the furrow wall of the previously formed furrow, in the case of the forward guide wheel 116, and against the furrow wall of the furrow opened by the disk 81 in the case of the rear guide wheel 125. The soil removed by the disk 81 flows upwardly onto the conveyor belt 156 and is discharged laterally outwardly of the machine by the movement of the conveyor or elevator belt 156, the same being driven from the power take-off shaft of the tractor. The position of the receiving end of the conveyor unit relative to the disk may be adjusted at any time by raising the inner end, removing the pins 181 and placing them in other holes in the angles 142 and 143 and then letting the inner end of the conveyor rest on the plow frame channels 43 and 44. It will thus be seen that terraces of any desired contour may be easily and quickly constructed by the use of my machine. Ordinarily, the machine is driven along one side of the projected terrace, the disk being lowered to remove soil from the ground and the elevator or conveyor belt will transfer the soil over onto the terrace. On the return trip on the other side of the terrace the same operation occurs, so that by repeated rounds the terrace is easily and quickly built.

Figure 8:
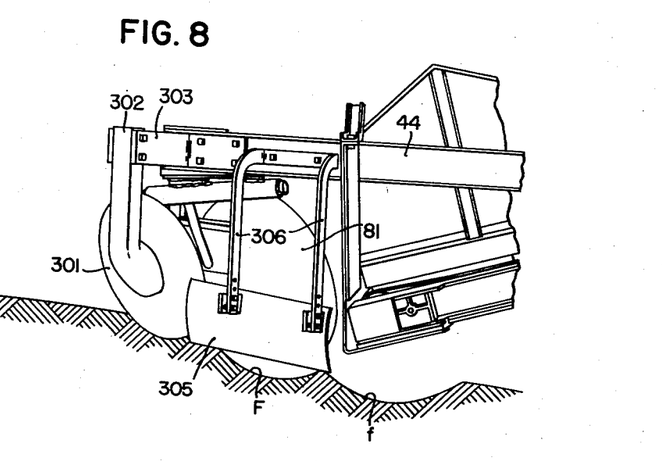
Figure 8 shows a modified form of the present invention in which an auxiliary disk is provided for turning some of the top soil back into the bottom of a previously formed furrow.

Under some conditions, such as, for example, where the top soil is relatively thin and the underlying sub-soil poor or deficient in crop growing qualities, it may not be desirable to leave the channel alongside the terrace bare of all top soil. To that end, I have devised a modified form of the present invention which is best shown in Figure 8. Referring now to this figure, an auxiliary disk 301 is carried by a standard 302 which at its upper end is bolted to a bracket 303 detachably connected to the rear plow frame angle 44 in a position above, rearwardly and landwardly of the main plow disk 81. The auxiliary disk 301 is disposed so as to remove only the top soil of the ground immediately adjacent the furrow F formed by the main plow disk 81. The disk 301 is angled so as to deposit the top soil either in the immediately adjacent furrow F behind the disk 81 or, if desired, a shield 305 may be provided for conveying the top soil across the furrow F into a previously formed furrow f. The shield 305 preferably is in the form of a blade to be carried in a more or less vertical position and at an angle that will tend to move the top soil loosened by the disk 301 into the channel back of the machine. The landward end of the shield lies back of the disk 301 and the shield is of sufficient length to carry top soil at least into the furrow F and also into the previously formed furrow f where desired. Preferably, provision may be made for vertical and/or angular adjustment of the shield in order to provide for disposing the same in the proper position. In this way, the top soil is not carried over into the terrace but is left on the upper surface of the bare ground from which soil has been removed on previous rounds.

A further modified form of the present invention is shown in Figure 9. Under some conditions, it may be desirable to build the terrace by removing soil only from one side, and to that end the terracing machine of the present invention may be hitched to a tractor so as to be driven in opposite directions thereby. When used in this way, it is desirable to provide a furrow opening disk of the reversible type to take the place of the plow disk 81 and associated connections shown and described above. Referring now to Figure 9, a disk 315 is mounted on a disk supporting standard or beam 316 which has its upper end formed as a journal section received for rotation in a vertical sleeve 318 fixed to the frame channel 45 in any suitable manner, as by an attachment plate 317 which may be bolted or welded to the channel 45. A thrust receiving bracket 320 is also bolted, as at 321, to the channel 45 and extends downwardly therefrom and serves as a support for an arcuate channel guide 323 in which a roller 324 carried in suitable lugs 325 is disposed, the lugs 325 being secured rigidly to the lower end of the disk-supporting beam or standard 316. The curved channel or guide 323 is disposed in a position to be arcuate about the center coinciding with the axis of rotation of the beam or standard 316 in the sleeve 318. The bracket 320 includes a reenforcing brace 330 which at its upper end may be connected to the cross bar 45 in any suitable way. Any suitable means may be provided for holding the disk 315 and disk standard 316 in a position facing either forwardly or rearwardly so as to provide for either forward or rearward direction of travel of the machine. The standard 316 is so disposed that the disk 315 delivers soil to the receiving end of the conveyor unit in either position of the disk.

For operation in this way the terracing machine preferably is connected with a tractor of the two-wheel or unstable type, the connection being made so that the implement may either be pushed or pulled, as desired.

While I have shown and described above, the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A terracing machine comprising a generally U-shaped plow frame, a soil-removing plow carried by one end portion of said plow frame, the other end portion including laterally extending fore and aft spaced apart frame sections, a conveyor frame disposed between and pivotally connected with said frame sections and including an inner conveyor frame portion adjustable toward and away from said plow, an endless conveyor for receiving soil from said plow, roller means carried at the laterally outer end of said conveyor frame and on said inner conveyor frame portion for receiving said endless conveyor, adjustment of said inner conveyor frame portion relative to the other portion of the conveyor frame serving to adjust the tension in said conveyor, means for pivotally connecting the outer portion of said conveyor frame on the spaced apart frame sections of said plow frame, means serving as a yoke overlying said plow frame adjacent said soil removing plow and connected with the adjustable portion of said conveyor frame, said yoke means including generally vertically adjustable portions adapted to hold the soil-receiving end of said conveyor frame in different vertical positions relative to said soil removing plow, and overlapping side sections carried by said conveyor frame at the front and rear sides thereof, the laterally inner side sections being fixed to said yoke means and said adjustable conveyor frame portion and shiftable relative to the other side sections, said other side sections being fixed to the laterally outer portions of said conveyor frame.

2. A terracing machine adapted to be connected to and partially supported on a propelling tractor, said terracing machine comprising a plow frame, a plow element carired thereby, a single ground wheel connected with said plow frame generally landwardly of said plow element in transverse alignment therewith, a conveyor frame extending laterally from said plow frame, an extension fixed to said plow frame and extending laterally outwardly therefrom, means pivotally connecting the outer end of the conveyor frame to the outer end of said extension, means connected between the inner end of the conveyor frame and the adjacent portion of the plow frame for limiting the downward movement of the inner end of the conveyor frame relative to said plow frame about the axis of pivotal connection of said frames, ground wheel means connected supportingly with the laterally outer end of said conveyor frame generally in transverse alignment with said plow element and said first ground wheel and disposed laterally outwardly of the pivotal connection between the laterally outer end of said conveyor frame and said plow frame extension, whereby a part of the weight of the plow frame and said extension is carried by said conveyor frame wheel means, and a part of the weight of the conveyor frame is carried on said single ground wheel, and a hitch structure connected at its rear end in vertically rigid relation to said plow frame and adapted to be supportingly connected at its forward end to said tractor for lateral swinging relative to the tractor.

3. A terracing machine adapted to be connected to and partially supported on a propelling tractor, said terracing machine comprising a plow frame, a plow element fixed to said plow frame, ground wheel means connected with said plow frame laterally outwardly of said plow element, a conveyor frame extending laterally outwardly from said pow frame in a direction opposite from said ground wheel means, a hitch frame connected at its rear end with the plow frame in lateral and vertical rigidity and connected at its forward end to the tractor for both lateral and vertical swinging relative thereto, ground wheel means connected supportingly with the outer end of said conveyor frame and generally in transverse alignment with said first ground wheel means, means pivotally connecting the laterally outer portion of said conveyor frame with the laterally outer portion of said plow frame at two fore-and-aft spaced apart points, means fixing the laterally inner end of said conveyor frame to said plow frame at two fore-and-aft spaced apart points including means at each side of the conveyor frame for changing the vertical position of the laterally inner end of said conveyor frame relative to said plow element, whereby each of said frames is partially supported on the other and the associated ground wheel means, and means connecting the hitch frame in vertically rigid relation with said plow frame and in horizontally rigid relation with said conveyor frame.

4. A terracing machine adapted to be connected to and partially supported on a propelling tractor having a power take-off, said terracing machine comprising a plow frame, a plow element carried thereby, a single ground wheel connected with the rear portion of said plow frame, a conveyor frame extending laterally outwardly from said plow frame, a conveyor means carried by said conveyor frame, an extension fixed to said plow frame and extending laterally outwardly therefrom, means pivotally connecting the outer end of the conveyor frame to the outer end of said extension, means connected between the inner end of the conveyor frame and the adjacent portion of the plow frame for limiting the downward movement of the inner end of the conveyor frame relative to said plow frame about the axis of pivotal connection of said frames, ground wheel means connected supportingly with the laterally outer end of said conveyor frame laterally outwardly of said axis, whereby a part of the weight of the plow frame and said extension is carried by said conveyor frame wheel means, and a part of the weight of the conveyor frame is carried on said single ground wheel means, and drive means connected with said power take-off shaft and acting coincidentally with the axis of pivoting of said conveyor frame relative to the plow frame for driving said conveyor.

5. A terracing machine adapted to travel across a field to be terraced, said machine comprising a generally U-shaped plow frame disposable transversely relative to the line of travel, a conveyor unit comprising a pair of relatively adjustable laterally inner and outer frames disposed between the side portions of said plow frame, means pivoting the laterally outer portion of said outer frame to the laterally outer ends of the spaced apart side portions of said U-shaped plow frame, a soil-removing plow carried by the laterally inner end of said plow frame opposite said spaced apart plow frame portions, a conveyor carried at opposite ends on said relatively adjustable frames respectively, means slidably engaging said plow frame for shiftably supporting the inner end of the inner of said relatively adjustable conveyor frames in different positions of adjustment thereof along said plow frame, and said slidable means including means for varying the position of the laterally inner end of said conveyor generally vertically relative to said plow frame.

6. A terracing machine comprising a generally U-shaped plow frame including a central section and a pair of fore-and-aft spaced apart, laterally extending sections, there being an open space between said sections, a soil-removing plow carried by the central section of said plow frame, a conveyor frame disposed in the space between the outer ends of said laterally extending plow frame sections and pivotally connected at a pair of fore-and-aft spaced points to the outer ends of said plow frame sections, a conveyor carried by said conveyor frame and having its soil-receiving end disposed adjacent said plow to receive soil therefrom, means for rigidly supporting the inner end of said conveyor frame with said plow frame at a pair of fore-and-aft spaced apart points adjacent said plow, whereby said plow frame and conveyor frames are held against tilting, one relative to the other, about a laterally extending axis, said supporting means comprising a yoke extending in a generally fore-and-aft direction and including front and rear leg sections connected at their lower ends with said conveyor frame and means connected with leg sections and disposable in different vertical positions relative thereto and engaging said laterally extending plow frame sections for supporting said yoke in different vertical positions on said plow frame at two fore-and-aft points thereon, a ground-engaging wheel connected with said plow frame generally adjacent said central section and disposed generally between the vertical transverse planes passing through the laterally extending fore-and-aft sections of the plow frame, said conveyor frame extending laterally beyond the laterally outer ends of said plow frame sections, ground-engaging means carried by the laterally outer end of said conveyor frame, laterally outwardly beyond the ends of said plow frame sections, and a forwardly extending hitch frame connected at one side to the plow frame at a pair of vertically spaced apart points thereon adjacent said central section, so as to be vertically rigid with said plow frame, and at the other side to the conveyor frame adjacent its pivotal connection to the forward laterally extending section of the plow frame.

References Cited in the file of this patent

UNITED STATES PATENTS

| Number | Name | Date |
|---|---|---|
| Re. 4,676 | Wauchope | Dec. 12, 1871 |
| 935,992 | Kerr | Oct. 5, 1909 |
| 1,150,588 | Fell | Aug. 17, 1915 |
| 1,471,887 | Dorney et al. | Oct. 23, 1923 |
| 1,827,897 | Miller | Oct. 20, 1931 |
| 1,890,972 | Davis | Dec. 13, 1932 |
| 2,089,319 | Wooley et al. | Aug. 10, 1937 |
| 2,248,709 | Jarmin | July 8, 1941 |
| 2,256,816 | Scarlett | Sept. 23, 1941 |
| 2,526,186 | Allen et al | Oct. 17, 1950 |
| 2,555,335 | Gulick | June 5, 1951 |
| 2,577,885 | Gay, Jr. | Dec. 11, 1951 |